United States Patent
Kimura et al.

(10) Patent No.: US 10,291,034 B2
(45) Date of Patent: May 14, 2019

(54) METHOD AND DEVICE FOR OPERATING POWER SYSTEM, AND RECHARGEABLE-BATTERY MANAGEMENT DEVICE

(71) Applicants: Hitachi, Ltd., Chiyoda-ku, Tokyo (JP); Kabushiki Kaisha Toshiba, Minato-ku, Tokyo (JP)

(72) Inventors: Yasutaka Kimura, Tokyo (JP); Mitsuo Tsurugai, Tokyo (JP); Toshiyuki Fujikawa, Tokyo (JP); Hyogo Takami, Tokyo (JP); Tomoyuki Nakamura, Tokyo (JP); Taichi Isogai, Tokyo (JP)

(73) Assignees: Hitachi, Ltd., Tokyo (JP); Kabushiki Kaisha Toshiba, Tokyo (JP)

( * ) Notice: Subject to any disclaimer, the term of this patent is extended or adjusted under 35 U.S.C. 154(b) by 639 days.

(21) Appl. No.: 14/377,277

(22) PCT Filed: Feb. 13, 2013

(86) PCT No.: PCT/JP2013/053343
§ 371 (c)(1),
(2) Date: Aug. 7, 2014

(87) PCT Pub. No.: WO2013/122079
PCT Pub. Date: Aug. 22, 2013

(65) Prior Publication Data
US 2016/0020613 A1     Jan. 21, 2016

(30) Foreign Application Priority Data
Feb. 16, 2012 (JP) .................. 2012-031262

(51) Int. Cl.
*H02J 3/32* (2006.01)
*H02J 4/00* (2006.01)
(Continued)

(52) U.S. Cl.
CPC .................. *H02J 4/00* (2013.01); *H02J 3/32* (2013.01); *H02J 3/381* (2013.01); *H02J 2003/146* (2013.01)

(58) Field of Classification Search
None
See application file for complete search history.

(56) References Cited

U.S. PATENT DOCUMENTS 8,433,453 B2 *  4/2013  Tsunoda .................. G05D 9/12
                                                          700/22
8,574,741 B2 * 11/2013  Sato .................. H01M 10/3909
                                                          320/103
(Continued)

FOREIGN PATENT DOCUMENTS

EP    2 418 754 A2    2/2012
JP    2005-102357 A    4/2005
(Continued)

OTHER PUBLICATIONS

Fukuda; JP 2006-094649; see machine translation attached.*
(Continued)

*Primary Examiner* — Jared Fureman
*Assistant Examiner* — James P Evans
(74) *Attorney, Agent, or Firm* — Crowell & Moring LLP

(57) ABSTRACT

A method and device for operating a power system, and a rechargeable-battery management device that extracts maximum performance from rechargeable batteries and uses the batteries evenly while taking into consideration cost and the operation of the batteries are provided. According to the method for operating a power system provided with a plurality of rechargeable-battery devices and a plurality of electric generators, the amount of power that a rechargeable battery available during a scheduled time period on a scheduled date will be able to supply is determined, an economic-dispatch calculation including the determined (Continued)

amount of power that the aforementioned rechargeable battery will be able to supply is performed for the power system, and the rechargeable battery is used to supply power during the scheduled time period on the scheduled date.

18 Claims, 13 Drawing Sheets

(51) Int. Cl.
*H02J 3/38* (2006.01)
*H02J 3/14* (2006.01)

(56) References Cited

U.S. PATENT DOCUMENTS

| | | | | |
|---|---|---|---|---|
| 8,626,351 | B2* | 1/2014 | Hirato | G05B 13/024 |
| | | | | 700/291 |
| 9,096,140 | B2* | 8/2015 | Ha | B60L 11/1816 |
| 2004/0088207 | A1* | 5/2004 | Fromherz | G06Q 10/06314 |
| | | | | 705/7.24 |
| 2008/0114499 | A1* | 5/2008 | Hakim | G06Q 50/06 |
| | | | | 700/291 |
| 2011/0087381 | A1* | 4/2011 | Hirato | G05B 13/024 |
| | | | | 700/291 |
| 2012/0004787 | A1* | 1/2012 | Kimura | H02J 3/32 |
| | | | | 700/297 |
| 2012/0010757 | A1* | 1/2012 | Francino | G05B 15/02 |
| | | | | 700/291 |
| 2012/0038212 | A1* | 2/2012 | Arata | H02J 3/32 |
| | | | | 307/46 |
| 2012/0139499 | A1* | 6/2012 | Tanaka | H02J 3/008 |
| | | | | 320/134 |
| 2012/0235625 | A1* | 9/2012 | Takehara | H01M 10/44 |
| | | | | 320/101 |
| 2012/0277930 | A1 | 11/2012 | Ebata et al. | |
| 2013/0054045 | A1* | 2/2013 | Ramezani | B60L 11/1844 |
| | | | | 700/297 |
| 2013/0140889 | A1* | 6/2013 | Hirato | H02J 3/32 |
| | | | | 307/23 |
| 2013/0285610 | A1* | 10/2013 | Katou | H01M 10/42 |
| | | | | 320/125 |
| 2014/0012428 | A1* | 1/2014 | Taniguchi | H02J 7/35 |
| | | | | 700/291 |
| 2014/0046495 | A1* | 2/2014 | Magnussen | H02J 3/14 |
| | | | | 700/291 |
| 2016/0118795 | A1* | 4/2016 | Berkowitz | H02J 3/1807 |
| | | | | 700/286 |

FOREIGN PATENT DOCUMENTS

| | | |
|---|---|---|
| JP | 2006-94649 A | 4/2006 |
| JP | 2009-273359 A | 11/2009 |
| JP | 2011-114900 | 6/2011 |
| JP | 2011-114919 A | 6/2011 |
| JP | 2012-10452 A | 1/2012 |
| WO | WO 2011/024769 A1 | 3/2011 |
| WO | WO 2011/042786 A1 | 4/2011 |
| WO | WO 2011/111475 A1 | 9/2011 |
| WO | WO 2012/014332 A1 | 2/2012 |

OTHER PUBLICATIONS

Human Translation of JP 2006094649; Toshiba Co. LTD.; Tetsuo Sasaki et al; Apr. 2006.*

Japanese-language Office Action issued in counterpart Japanese Application No. 2012-031262 dated Jul. 19, 2016 with English translation (8 pages).

European Search Report issued in counterpart European Application No. 13749828.3 dated Oct. 12, 2015 (ten (10) pages).

Corresponding International Search Report dated May 21, 2013 with English Translation (four (4) pages).

Japanese-language Office Action issued in counterpart Japanese Application No. 2012-031262 dated Mar. 8, 2016 with partial English translation (5 pages).

* cited by examiner

FIG. 4
| | OUTPUT [kW] | CAPACITY [kWh] | SOC [%] | | | | SOC [kWh] | | | |
|---|---|---|---|---|---|---|---|---|---|---|
| | | | EARLY | FINAL | LOWER LIMIT | UPPER LIMIT | EARLY | FINAL | LOWER LIMIT | UPPER LIMIT |
| STORAGE BATTERY 6a | 30 | 40 | 20 | 20 | 5 | 95 | 8 | 8 | 2 | 38 |
| STORAGE BATTERY 6b | 60 | 120 | 35 | 35 | 5 | 95 | 42 | 42 | 6 | 114 |
| STORAGE BATTERY 6c | 50 | 100 | 60 | 60 | 5 | 95 | 60 | 60 | 5 | 95 |
| STORAGE BATTERY 6d | 20 | 60 | 40 | 40 | 5 | 95 | 24 | 24 | 3 | 57 |
SOCL    SOCU
FIG. 5
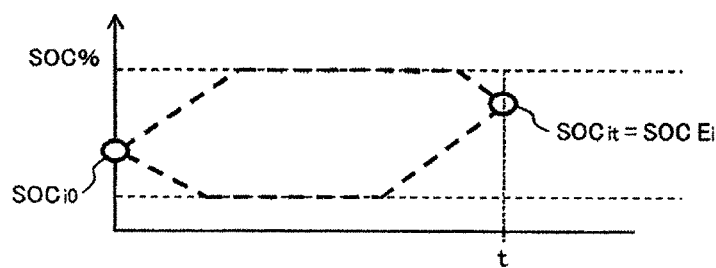
FIG. 6
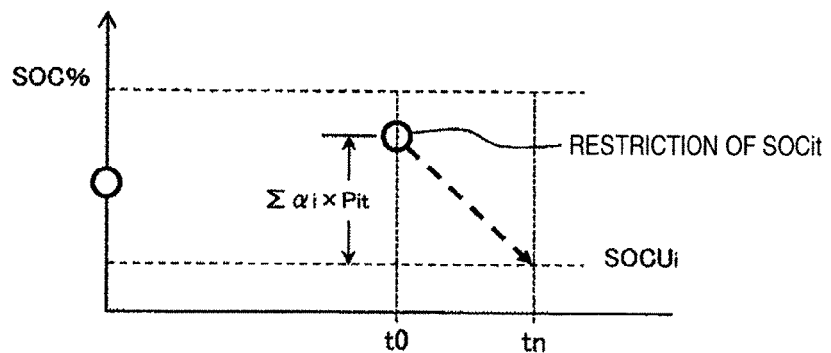

FIG. 9

POWER GENERATION COST (SYSTEM λ)

| TIME | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| λ | 6 | 5 | 4 | 3 | 2 | 3 | 4 | 5 | 6 | 8 | 9 | 10 | 9 | 10 | 13 | 13 | 13 | 12 | 11 | 10 | 9 | 8 | 7 | 6 |

FIG. 10

| | CHANGE IN TIME OUTPUT | | CHANGE IN Σ OUTPUT | | EFFICIENCY [%] | |
|---|---|---|---|---|---|---|
| | CHARGE | DISCHARGE | CHARGE | DISCHARGE | CHARGE | DISCHARGE |
| STORAGE BATTERY 6a | 10 | 10 | 10 | 10 | 86 | 86 |
| STORAGE BATTERY 6b | 11 | 11 | 11 | 11 | 86 | 86 |
| STORAGE BATTERY 6c | 12 | 12 | 12 | 12 | 86 | 86 |
| STORAGE BATTERY 6d | 13 | 13 | 13 | 13 | 86 | 86 |

METHOD AND DEVICE FOR OPERATING POWER SYSTEM, AND RECHARGEABLE-BATTERY MANAGEMENT DEVICE

TECHNICAL FIELD

The present invention relates to a method and device for operating a power system, and a rechargeable-battery management device and more particularly to the operating method and device of the power system and the rechargeable-battery management system in which rechargeable batteries or storage batteries installed in the power system are managed by the whole power system to make a contribution to balance between demand and supply of electric power and minimization of electric power cost.

BACKGROUND ART

In the conventional operation of the power system, the demand and supply operation of electric power for maintaining the balance between demand and supply of electric power and the system operation for distributing electric power generated in power plants to consumers while ensuring power quality such as voltage are main operations.

As the demand and supply operation of electric power for maintaining the balance between demand and supply, demand and supply of electric power are controlled in an electric power company. The demand and supply control is to control the power generation amount to make equal to the load varied every moment and includes economic load distribution control for controlling long-period components longer than or equal to ten-odd minutes and frequency control for controlling short-period components of several minutes to dozens of minutes.

In the economic load distribution control of them, electric generators such as thermal, hydraulic and atomic electric generators installed in parallel with the power system are decided in consideration of power generation cost of the whole power system. A so-called economic operation for deciding the optimum output distribution of each power plant is subjected to the planned operation on the basis of a predetermined load curve during a day (daily load curve).

On the other hand, in the frequency control, imbalance between demand and supply of electric power is calculated from detection values of frequency and linkage line current and adjustment instructions for electric generators are supplied to each power plant on the basis of the calculated imbalance. In this case, the thermal and hydraulic electric generators are subjected to the frequency control but the atomic electric generators which have large output are frequently operated at fixed load. With regard to this point, in future, there is a tendency to reduce the thermal electric generators which emit greenhouse gases and increase the atomic power plants in view of the global environment problem. Accordingly, it is supposed that thermal power which is easy to adjust the output is reduced to thereby make adjustment between demand and supply of electric power difficult.

Next, as the system operation, the obligation that electric power in transformer substations and power transmission facilities is controlled to ensure the quality of electric power and the electric power is distributed to consumers is assumed. However, recently, there is a tendency to increase load due to the increased introduction amount of scattered-type power sources and the spread of electrification of all appliances. As a result, it is supposed that the load amount exceeds the capacity of the transformer substations and the pole transformers and in the present circumstances it is obliged to increase investment in plant and equipment in order to ensure the reliability of supply.

As a method of solving the above two problems, recently, attention is paid to secondary batteries containing storage batteries. The storage batteries are frequently installed on the consumer side and can store electric power. The storage batteries are mainly installed for the purpose of the following two objects in many cases.

The first object is to utilize the storage batteries as subsidiary use for rationalization of power cost on the consumer side and the second object is to control the current at the linkage point where micro-grids of the small-scale power system and the power system are linked Here, the reason of utilizing the storage batteries as subsidiary use for rationalization of power cost on the consumer side which is the first object is described. When a consumer decides a power contract with the power company, the consumer predicts the maximum annual power consumption and makes the contract so as not to exceed the maximum annual power consumption in many cases. The reason is that the consumer must pay a penalty to the power company for exceeding the maximum annual power consumption.

Accordingly, when the consumer is provided with the storage batteries, the consumer can avoid exceeding the maximum annual power amount as well as reduce the contracted power itself. Further, the consumer can sell surplus power and accordingly it is profitable for the consumer. However, in the present circumstances, it is not profitable economically to sell the electric power stored in the storage batteries to the power system as it is and accordingly the storage batteries are used in combination with scattered-type power sources in order to improve the operation efficiency of the scattered-type power sources, so that electric power generated by the scattered-type power sources is sold in many cases.

Next, in the utilization method of the storage batteries as the micro-grids of the small-scale power system which is the second object, the storage batteries are installed in order to reduce the load on the power system by controlling the scattered-type power sources containing new energy and the load so as to make the current at the linkage point with the power system equal to 0 or fixed.

However, in order to control the storage batteries, it is necessary to monitor individual storage batteries and implement a complicated control procedure, which results in a higher construction cost of the control system. Accordingly, it is further necessary to permanently station a manager who operates the control system. As described above, when the storage batteries are introduced generally, the performance of the storage batteries is not fully utilized and surplus power is left, so that further utilizable potential is preserved.

As described above, since the storage batteries installed on the consumer side do not fully utilize the charge and discharge capacity of the storage batteries, the storage batteries can be further utilized. Patent Literature 1 describes the method of filling the potential of the secondary batteries containing the storage batteries.

Concretely, the method uses an apparatus in which the secondary batteries installed on the consumer side using electric power and which is connected to the power system which supplies electric power to the consumers and makes charge and discharge of electric power for the consumers are employed to control the power system. Here, the apparatus includes a control amount calculation part for calculating the total amount of charge and discharge of electric power by all secondary batteries necessary for control of the power system, an effect calculation part for calculating the sensitivity to the power system of the secondary batteries as control effect to the power system of the secondary batteries and a distribution amount calculation part which performs distribution calculation for distributing the total amount of charge and discharge of electric power calculated by the control amount calculation part to the secondary batteries in order of the control effect calculated by the effect calculation part, and the secondary batteries are controlled on the basis of the result of distribution calculation by the distribution amount calculation part.

CITATION LIST

Patent Literature

PATENT LITERATURE 1: JP-A-2009-273359

SUMMARY OF INVENTION

Technical Problem

In the Patent Literature 1, the secondary batteries are utilized as the whole power system. In the utilization method of the secondary batteries in this patent literature, the secondary batteries having the highest sensitivity are selected to be utilized in order to improve the state of the power system in accordance with change in the state of the power system in the short term. According to this method, since the secondary batteries are utilized in order of higher efficiency, there is a possibility that the storage batteries to be used are distorted. Further, since operation of the whole system is not considered, there remains a possibility that the cost is relatively expensive as compared with the cost in the present state.

The utilization method of the secondary batteries as the whole power system in the Patent Literature 1 is to cope with the short-term variation of the power system successively and it can be said that the utilization method is a control method near to so-called frequency control of the power system.

In contrast, the utilization method of the present invention is pointed to control for more long-term variation. That is, the storage batteries are to be utilized in the control method near to the economic load distribution control.

It is an object of the present invention to provide a method and device of operating a power system and a storage battery management device which extracts maximum performance from the storage batteries and utilizes the storage batteries evenly while considering operation and cost of the storage batteries.

Solution to Problem

In order to solve the above problems, according to the present invention, the operation method of a power system including plural storage battery devices and plural electric generators comprises calculating power amounts by storage batteries capable of supplying electric power in a prearranged time period on the prearranged date, calculating economic load distribution of the power system containing the power amounts by the storage batteries and supplying electric power by the decided storage batteries in the prearranged time period on the prearranged date.

Further, when the power amounts by the storage batteries capable of supplying electric power in the prearranged time period on the prearranged date are calculated, operation plans in the individual storage battery devices of the consumers are considered.

Moreover, when the power amounts by the storage batteries capable of supplying electric power in the prearranged time period on the prearranged date are calculated, restriction conditions are considered from output (kW) and capacity (kWh) of the individual storage battery devices.

Furthermore, when the power amounts by the storage batteries capable of supplying electric power in the prearranged time period on the prearranged date are calculated, efficiency of the individual storage battery devices is considered.

Further, when the power amounts by the storage batteries capable of supplying electric power in the prearranged time period on the prearranged date are calculated, cost for each time period in the power system is considered.

Moreover, when the power amounts by the storage batteries capable of supplying electric power in the prearranged time period on the prearranged date are calculated, operation circumstances of the storage batteries are changed in advance so that the storage batteries can be used in the prearranged time period.

In order to solve the above problems, according to the present invention, the operation method of the power system including plural storage battery devices and plural electric generators comprises designating a prearranged time period on a prearranged date, calculating maximum power amounts by the storage batteries capable of supplying electric power in the time period, calculating economic load distribution of the power system containing the maximum power amounts by the storage batteries, deciding power amounts capable of being supplied by the storage batteries under conditions decided as a result of the economic load distribution calculation and supplying electric power by the storage batteries having the re-decided power amounts in the prearranged time period.

In order to solve the above problems, according to the present invention, the operation method of the power system including plural storage battery devices and plural electric generators comprises calculating economic load distribution of the power system containing the power amounts by the storage batteries capable of supplying electric power in a prearranged time period on a prearranged date and supplying electric power by the storage batteries in the prearranged time period on the prearranged date.

In order to solve the above problems, according to the present invention, the operation device of the power system including plural storage battery devices and plural electric generators comprises means for designating a prearranged time period on a prearranged date, power amount calculation means for calculating maximum power amounts by the storage batteries capable of supplying electric power in the prearranged time period, economic load distribution calculation means for calculating economic load distribution of the power system containing the maximum power amounts by the storage batteries, power amount decision means for deciding power amounts capable of being supplied by the storage batteries under conditions decided as a result of the economic load distribution calculation and storage battery control means for supplying electric power by the storage batteries having the re-decided power amounts in the prearranged time period.

Further, the power amount calculation means includes means for inputting operation plans of individual storage battery devices of consumers and when the power amounts by the storage batteries capable of supplying electric power in the prearranged time period on the prearranged date are calculated, the operation plans are considered.

Moreover, the power amount calculation means includes means for inputting restriction data for output (kW) and capacity (kWh) of the individual storage battery devices and when the power amounts by the storage batteries capable of supplying electric power in the prearranged time period on the prearranged date are calculated, restriction conditions are considered from the output (kW) and the capacity (kWh).

Furthermore, the power amount calculation means includes means for inputting efficiency of the individual storage battery devices and when the power amounts by the storage batteries capable of supplying electric power in the prearranged time period on the prearranged data are calculated, the efficiency of the individual storage battery devices is considered.

Further, the power amount calculation means includes means for inputting cost for each time period in the power system and when the power amounts by the storage batteries capable of supplying electric power in the prearranged time period on the prearranged date are calculated, the cost for each time period in the power system is considered.

Furthermore, the power amount calculation means includes control means to issue control instructions for changing operation circumstances of the storage batteries in advance so that the storage batteries can be used in the prearranged time period when the power amounts by the storage batteries capable of supplying electric power in the prearranged time period on the prearranged date are calculated.

In order to solve the above problems, according to the present invention, the operation device of the power system which operates the power system including plural storage battery devices and plural electric generators in accordance with instructions from a central power supply instructing device, comprises means disposed in the central power supply instructing device to designate a prearranged time period on a prearranged date, power amount calculation means disposed in a storage battery management device to calculate maximum power amounts by storage batteries capable of supplying electric power in the time period, economic load distribution calculation means disposed in the central power supply instructing device to calculate economic load distribution of the power system containing the maximum power amounts by the storage batteries, power amount decision means for deciding the power amounts capable of being supplied by the storage batteries under conditions decided as a result of the economic load distribution calculation, instruction means disposed in the storage battery management device to instruct supply of electric power by the storage batteries of the re-decided power amounts in the prearranged time period and storage battery devices installed in various places of the power system and having charge and discharge control function and communication function to transmit storage battery information to the storage battery management device and perform charge and discharge control in accordance with power supply instructions from the storage battery management device.

Further, the storage battery information to be transmitted to the storage battery management device includes operation plans, restriction data and efficiency of the storage battery devices.

Moreover, the storage battery management device obtains cost for each time period in the power system from the central power supply instructing device.

In order to solve the above problems, according to the present invention, the storage battery management device connected to storage battery devices installed in various places of the power system and having charge and discharge control function and communication function and a central power supply instructing device for calculating economic load distribution in consideration of power amounts supplied by the storage battery devices and supplying output instructions to plural electric generators of the power system comprises power amount calculation means for calculating maximum power amounts by storage batteries capable of supplying electric power in a prearranged time period on a prearranged data designated by the central power supply instructing device and transmission means for transmitting the power amounts capable of being supplied by the storage battery devices decided as a result of the economic load distribution calculation in the central power supply instructing device to the storage battery devices.

Advantageous Effects of Invention

According to the present invention, since the storage batteries are utilized effectively, maintenance and management costs, operation costs and labor costs concerning generation of electric power can be reduced by reducing the number of electric generators to be operated such as thermal, hydraulic and atomic electric generators of the power company and greenhouse gases such as $CO_2$ can be reduced. Further, according to the embodiment of the present invention, the following effects can be expected. Since the storage batteries can be managed collectively by the storage battery management device, it is not necessary to manage and control the storage batteries one by one individually and accordingly labor costs and investment in plant and equipment can be reduced greatly.

The consumers can utilize surplus power of the storage batteries effectively and obtain additional income.

The storage batteries are power sources capable of adjusting demand and supply of electric power from the standpoint of the power company and accordingly the storage batteries can be utilized as spare force of electric power supply and as reliable power sources having adjustable output power for surplus power measure in case where the power sources are more than loads. Other objects, features and advantages of the present invention will be apparent from the following description of the embodiments of the present invention taken in conjunction with the accompanying drawings.

BRIEF DESCRIPTION OF DRAWINGS

FIG. 4 is a diagram showing an example of restriction data D2 stored in a restriction data memory part DB1;

FIG. 5 is a diagram showing an example of SOC target restriction for guaranteeing SOC at a designated point of time;

FIG. 6 is a diagram showing SOC security restriction for securing SOC corresponding to a schedule at a certain point of time;

FIG. 9 is a diagram showing an example of power generation cost in each time period;

FIG. 10 is a diagram showing an example of characteristic data D4 stored in a characteristic data memory part DB4;

DESCRIPTION OF EMBODIMENTS

Embodiments are now described in detail with reference to the accompanying drawings.

Embodiment 1

Figure 1:
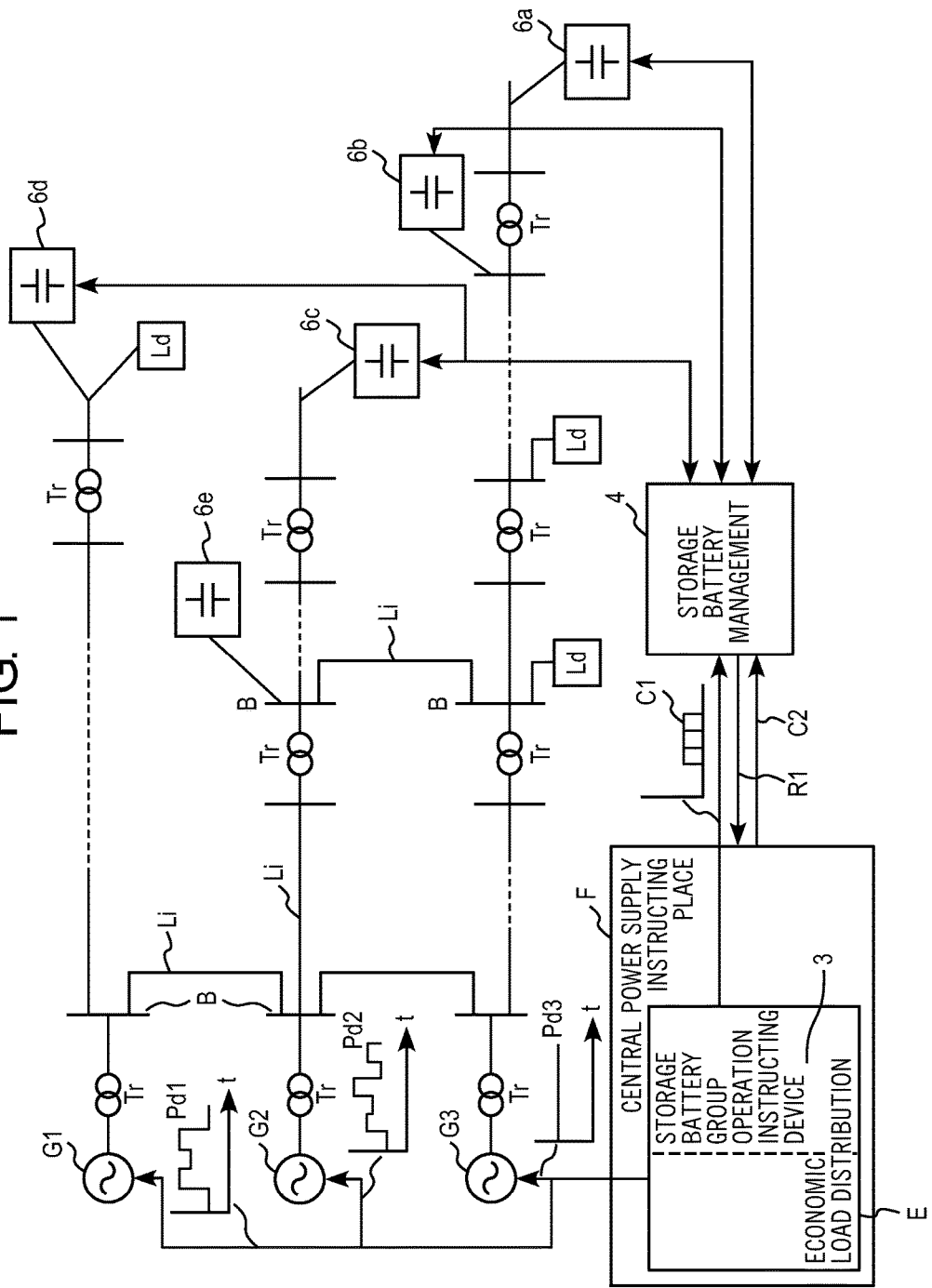
FIG. 1 is a schematic diagram illustrating a power system and a control system thereof to which the present invention is applied.

FIG. 1 schematically illustrates a power system and a control system thereof to which the present invention is applied. Here, the power system includes electric generators such as thermal electric generator G1, hydraulic electric generator G2 and atomic electric generator G3, transmission and transformer apparatuses such as bus lines B, transformers Tr and transmission lines Li and loads Ld. The power system further includes storage battery devices 6 (6a, 6b, 6c, 6d, and 6e). In the present invention, attention is paid to the storage battery devices 6.

In the operation of such a power system, a power company performs the demand and supply operation of electric power for maintaining the balance between demand and supply of electric power. The demand and supply control is to control the power generation amount to make equal to the load varied every moment and includes economic load distribution control for controlling long-period power variation components longer than or equal to ten-odd minutes and frequency control for controlling short-period power variation components of several minutes to dozens of minutes.

A central power supply instructing place F prepares an economic load distribution control signal for controlling demand and supply of electric power and a frequency control signal and supplies power demand instruction Pd to the electric generators G. The economic load distribution control function decides electric generators such as thermal, hydraulic and atomic electric generators installed in parallel with the system in consideration of the power generation cost of the whole power system to be decided as objects for so-called economic operation for deciding optimum output distribution for each power plant and performs planned operation on the basis of a predetermined load curve during a day (daily load curve).

In the present invention, the power demand and supply operation is performed even to the storage battery devices 6 as control objects of the economic load distribution control function in addition to the electric generators such as existing thermal, hydraulic and atomic electric generators. Concretely, a storage battery group operation instructing device 3 for preparing storage battery operation instruction C for the storage battery devices 6 is additionally installed in part of the function of an economic load distribution control device E in the central power supply instructing place F.

The method of preparing power demand instruction Pd supplied to electric generators and storage battery devices in the economic load distribution control device E can adopt various conventional thinking methods. The important matter is also to incorporate the storage battery devices 6 into the economic load distribution operation of the whole power system and decide total power demand instructions to the storage battery devices. The economic load distribution containing even the storage batteries is performed together with the thermal, hydraulic and atomic electric generators.

For this purpose, it is necessary to grasp and manage the operation circumstances of the individual storage battery devices dispersed in various places of the power system and the power amounts capable of being supplied by the storage battery devices in future (for example, tomorrow) that the economic load distribution control is performed in the storage battery management device 4 are calculated.

The storage battery group operation instructing device 3 makes inquiries about tomorrow's circumstances (storage battery operation instruction C1) to the storage battery management device 4 to confirm the power amounts (response signal R1) capable of being supplied by the storage battery devices and performs the economic load distribution in the whole power system, so that the storage battery group operation instructing device 3 instructs the storage battery management device 4 to make operation control of the storage batteries finally (storage battery operation instruction C2) in accordance with its result.

Figure 2:
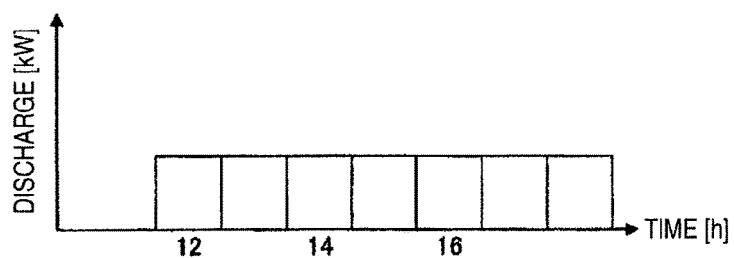
FIG. 2 is a graph showing an example of a storage battery operation instruction C from a storage battery group operation instructing device 3.

The storage battery operation instruction C from the storage battery group operation instructing device 3 is performed in two stages. The tomorrow's circumstance inquiry (storage battery operation instruction C1) in the first stage is the inquiry (communication) for supplying predetermined electric power from the storage battery devices during the period from 12:00 in the daytime to 18:00 as shown in FIG. 2, for example. In the example of FIG. 2, the power amount per hour during this period is fixed but it can be set to any power amount. Further, although not shown, charge of electric power is instructed to be made during the period from 4:00 to 7:00 in the early morning, for example.

On the other hand, the storage batteries to be controlled in the present invention are secondary batteries containing storage batteries and the storage batteries preparatively installed in order to be used for backup of load of consumers and control current at the linkage point of micro-grids and the power system can be utilized in the present invention.

However, it is indispensable for the storage battery devices 6 which can be applied to the present invention to give and receive electric power between the power system and the storage battery devices by using power conversion devices or the like together, make it possible to measure charge and discharge power amount of the batteries or state of the batteries and deliver control instructions and storage battery information between the storage battery management device 4 and the storage battery devices 6 through a communication device.

The storage battery management device 4 of FIG. 1 receives the storage battery operation instruction C from the storage battery group operation instructing device 3 in the central power supply instructing place F and supplies control instructions to plural storage battery devices 6. Further, the storage battery management device 4 receives storage battery information from plural storage battery devices 6.

The storage battery management device 4 is now described centering on its function. First, referring to FIG. 3, the maximum intensive amount calculation function for calculating the maximum intensive amount of charge and discharge surplus power of the storage battery devices 6 is described. This function is to confirm that the storage battery capacity larger than or equal to the storage battery capacity necessary to discharge the prearranged power amount in the prearranged time period is ensured.

In order to realize this function, the storage battery management device 4 obtains charge and discharge schedule D1 of the storage batteries, restriction data D2 such as rated output and capacity of the storage batteries and measurement information D3 such as SOC and output P from the storage battery devices 6. The charge and discharge schedule D1, the restriction data D2 and the measurement information D3 from the storage battery devices 6 are received by a data receiving part 41 of FIG. 3 and stored in a restriction data memory part DB1.

Among the above data, the charge and discharge schedule D1 of the storage batteries is the schedule by the operation plans on the consumer side having the storage battery devices 6. For example, the charge and discharge schedule D1 is based on the operation plans on the consumer side that the storage battery device 6a stops for inspection in a specified day on a specified month or performs discharge operation (or charge operation) periodically from what time to what time. The operation plans on the consumer side include changeable plans and unchangeable plans.

When the maximum intensive amount calculation function is implemented, the schedules on the consumer side are considered. For example, when stop is planned, the output of this storage battery device is not considered in the maximum intensive amount calculation or when discharge operation is scheduled, the discharge amount thereof is considered to be incorporated into calculation. Alternatively, to the contrary, the time period of the scheduled discharge operation is not limited to that time period and accordingly the schedule can be also changed in a case.

FIG. 4 shows an example of the restriction data D2 of the data stored in the restriction data memory part DB1. The restriction data D2 includes output (kW), capacity (kWh) and SOC (State of Charge) (%) stored as numerical values for the storage batteries 6a, 6b, 6c and 6d of the power system usable in control of the present invention. Further, the SOC's are stored in detail with initial values, final values, lower limit values and upper limit values.

The charge and discharge schedule D1 and the restriction data D2 of the storage batteries are data (restriction data) for restriction on operation of the storage battery devices 6 and the restriction conditions decided by the data are now described. The restriction conditions include restriction from the power amount kWh as shown by the expressions (1) to (4) and restriction from the electric power kW as shown by the expressions (5) to (7), which represent range and area to be considered in actual operation. Further, the measurement information D3 is the value measured for SOC and output P.

First, with regard to balance restriction of the battery state SOC, when a consumer number is i and time is t, the current state (SOCit) of SOC of the consumer number i is calculated from the expression (1) by subtracting a state change amount (Σstorage battery charge and discharge efficiency αi×battery output Pit) at the time that operation is made with the battery output Pit from the initial state (SOCi0) of SOC.

[MATH. 1]

$$SOCi0 - \Sigma \alpha_i \times Pit = SOCit \quad (1)$$

In this case, the current state (SOCit) of SOC is required to be within the range of upper and lower limit values (upper limit value SOCUi and lower limit value SOCLi) of SOC stored in FIG. 4. The expression (2) represents upper and lower limit restrictions of SOC.

[MATH. 2]

$$SOCLi \leq SOCit \leq SOCUi \quad (2)$$

Further, the current state (SOCit) of SOC is required to be the target restriction SOCEi of SOC for guaranteeing SOC at the specified time point t. The expression (3) represents the relation between the target restriction and the current state. Further, FIG. 5 shows the relation of the expression (3) as a value of SOC (vertical axis) to time t (horizontal axis). In this drawing, the initial state SOCi0 and the operation state thereafter may be changed any way, although this drawing means that the current state is required to be the target restriction SOCEi for guaranteeing SOC at the specified time point t.

[MATH. 3]

$$SOCit = SOCEi \quad (3)$$

Furthermore, when the storage battery is subjected to discharge operation during a certain period in accordance with the schedule, it is necessary to ensure the output Pit during the period and maintain SOC after the elapse of the period to be larger than or equal to the lower limit value SOCUi. The expression (4) represents this relation. Further, FIG. 6 shows this relation. This relation is SOC security restriction that SOC corresponding to the schedule is secured at a certain point of time t.

[MATH. 4]

$$SOCit - \Sigma \alpha_i \times Pit \geq SOCUi \quad (4)$$

The expressions (1) to (4) are restriction from the power amount kWh. Restriction from the power amount kW is next described.

The expression (5) shows upper and lower limit restriction of charge and discharge power of the storage batteries. That is, the current charge and discharge power output is required to be within the range of the designated upper and lower limit values (upper limit value PUi and lower limit value PLi).

[MATH. 5]

$$PL_i \leq P_{it} \leq PU_i \quad (5)$$

Further, the upper and lower limit restriction of storage battery collection and delivery schedule in case where the storage batteries are discharged in accordance with the schedule is shown by the expression (6).

[MATH. 6]

$$PsL_i \leq P_{it} \leq PsU_i \quad (6)$$

Furthermore, the upper and lower limit restriction of storage battery schedule in case where the storage batteries are discharged in accordance with the schedule is shown by the expression (7).

[MATH. 7]

$$PdL_i \leq P_{it} \leq PdU_i \quad (7)$$

On the other hand, in a storage battery pattern setting part 42 in the storage battery management device 4, the plan of the power amount to be born by the storage battery device group as a whole of the power system can be set by an operator as a signal (pattern signal) having the magnitude to time. This pattern is stored in a storage battery pattern setting memory part DB2. This pattern is expressed as shown in FIG. 2, for example, and is set to send a predetermined output from the storage battery device group during 12:00 to 18:00 to be stored. In setting by the operator, the operator inputs the storage battery operation instruction C1 decided by the central power supply instructing place F by hand basically and the operator can cope with fine adjustment, sudden change of situation and the like.

A storage battery device surplus power maximum intensive amount calculation part 45 estimates data stored in the restriction data memory part DB1 and decides whether the data can contribute to supply of electric power as the storage battery group and what its magnitude is when it can contribute thereto so as to realize supply of electric power by the storage battery devices in the power pattern stored in the storage battery pattern setting memory part DB2.

The storage battery device surplus power maximum intensive amount calculation part 45 makes the above decision in the following procedure, for example. First, it is confirmed whether the storage battery device 6a can contribute to the electric power supply or not. For example, when the charge and discharge schedule D1 of the storage battery is examined, the storage battery must be excluded if operation of the storage battery is prearranged to be stopped during the period from 12:00 to 18:00 in that day. Further, the charge and discharge schedule D1 of the storage battery contains the case where discharge thereof in the time period except the designated time period is prearranged and in this case the surplus power of this discharge is excluded from counting. Moreover, even if the storage battery is operated, there is a possibility that the storage battery fulfills the restriction conditions of the expressions (1) to (7).

When the storage battery devices do not fulfill the restriction conditions and can supply electric power sufficiently during this period, the output power thereof is added to the surplus power maximum intensive amount to be counted. In this judgment, the storage battery devices cannot make a contribution during the full period, although there is a case where contribution in a short period can be made or contribution can be made if output is reduced. Alternatively, the storage battery devices cannot make a contribution to supply of electric power in the present state, although the storage battery device is instructed to be charged so as to complete charge until the prearranged time of the supply of electric power, so that this output can be also added to the surplus power maximum intensive amount to be counted.

The storage battery device surplus power maximum intensive amount calculation part 45 repeats the above judgment for all of the storage battery devices 6, so that the electric power capable of being supplied is accumulated. In this manner, the maximum intensive amount for maximizing surplus power of the storage batteries is calculated. As described later, a combination of storage battery devices by which efficiency and cost are minimized can be selected from among the plural storage battery devices 6.

Figure 3:
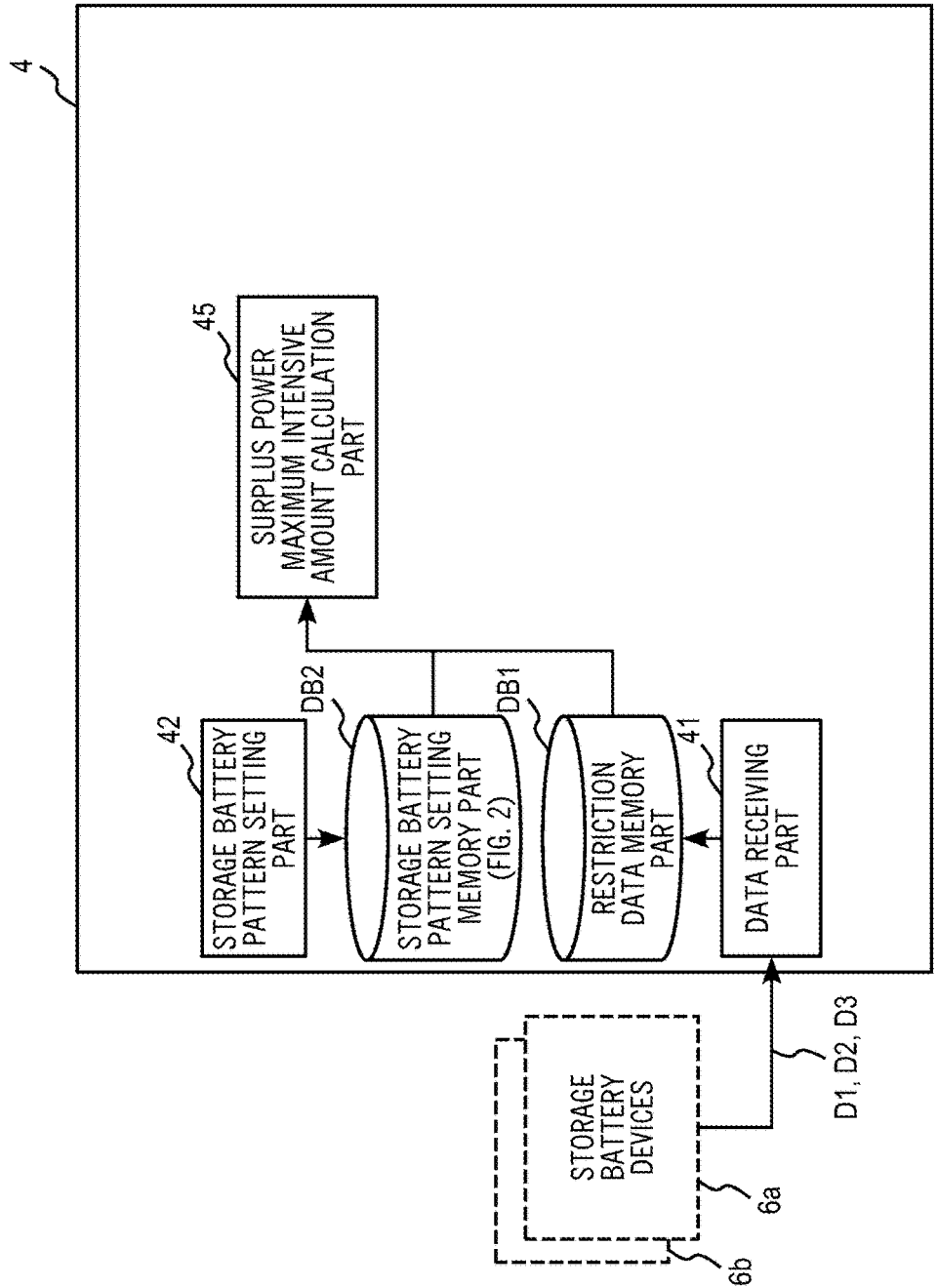
FIG. 3 is a diagram illustrating an example of maximum intensive amount calculation function of charge and discharge surplus power of a storage battery management device 4.
Figure 7:
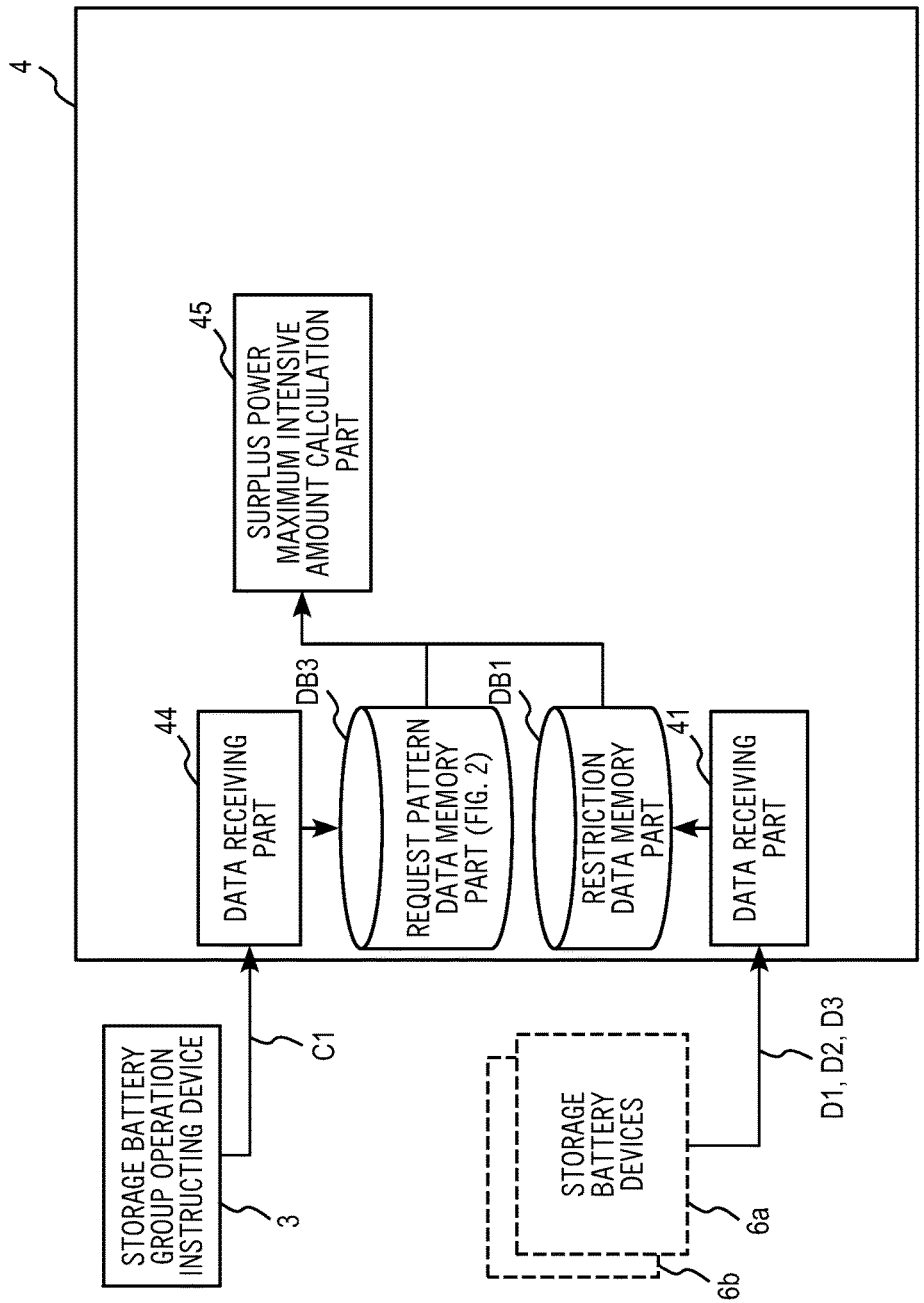
FIG. 7 is a diagram showing an example for giving instructions to the storage battery management device from a central power supply instructing place.

In the embodiment of FIG. 7, the storage battery pattern setting part 42 of the embodiment of FIG. 3 is changed to a data receiving part 44. The data receiving part 44 receives the storage battery operation instruction C1 from the storage battery group operation instructing device 3 in the central power supply instructing place F and stores it in a request pattern data memory part DB3. Furthermore, the storage battery pattern setting memory part DB2 and the request pattern data memory part DB3 store therein the substantially same contents and are different only in that the stored contents are supplied from the setting means 42 or are supplied while being linked with an instruction from the central power supply instructing place F. Other operation of the embodiment of FIG. 7 is the same as that of FIG. 3 and accordingly description thereof is omitted here.

Figure 8:
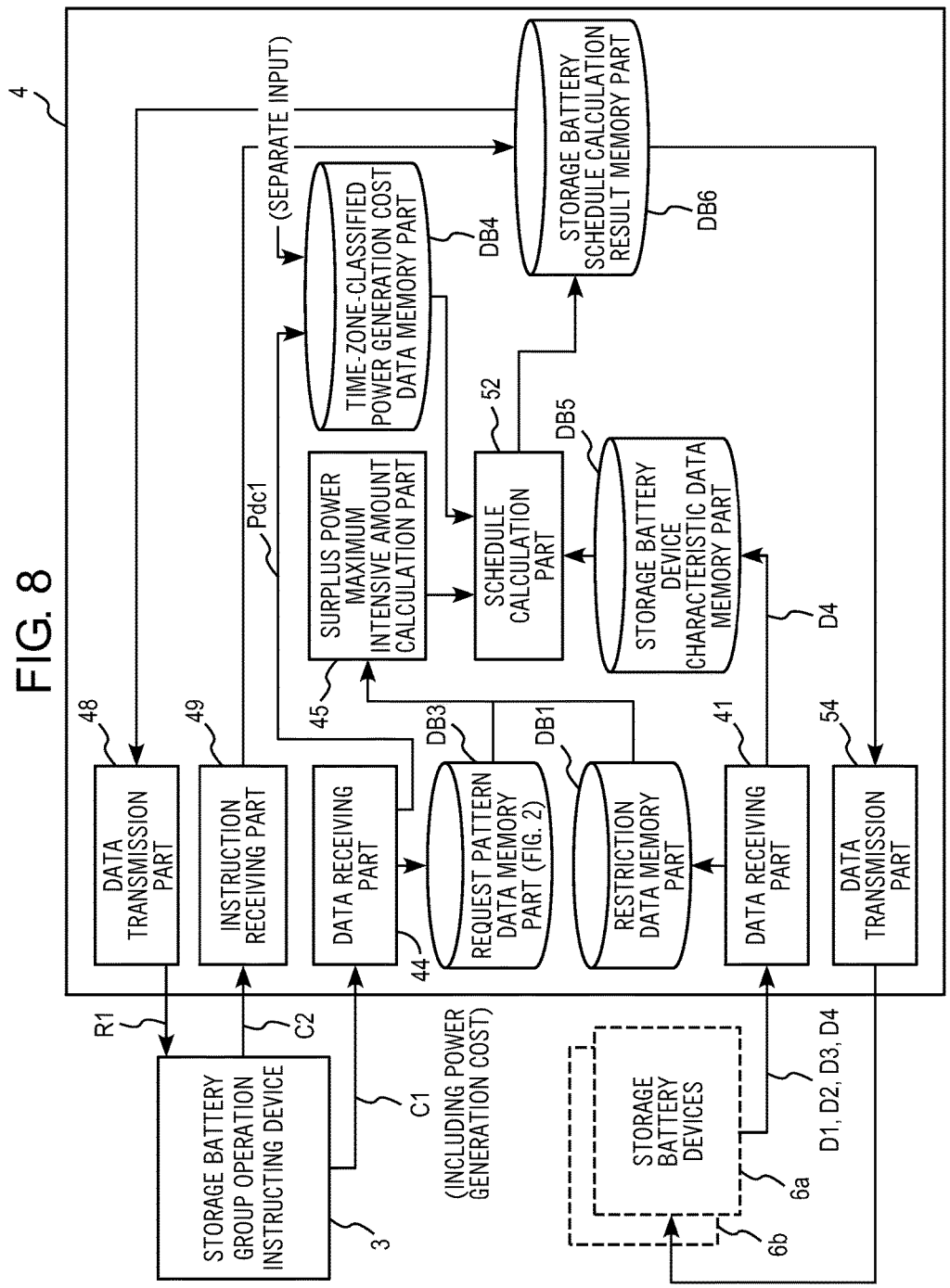
FIG. 8 is a diagram including schedule decision function in the storage battery management device 4.

FIG. 8 illustrates an example of the schedule calculation function of the storage battery management device 4 of the present invention. In the schedule calculation, the schedule about charge and discharge power of each of the storage battery devices 6 is calculated by a storage battery device schedule calculation part 52. This calculation result is stored in the storage battery schedule calculation result memory part DB6.

When a schedule is decided in the storage battery device schedule calculation part 52, the basic information is the surplus power maximum intensive amount calculated by the surplus power maximum intensive amount calculation part 45. The storage battery device schedule calculation part 52 obtains still some information externally when the surplus power maximum intensive amount is scheduled.

New external input is the power generation cost for each time period. Information C1 of the power generation cost is inputted from the storage battery group operation instructing device 3 through the data receiving part 44 and is stored in a time-period-classified power generation cost data memory part DB4. Furthermore, the information C1 of the power generation cost may be directly inputted by the operator.

FIG. 9 shows an example of power generation cost data classified by time periods. Since the thermal power plant having high unit power generation cost is made effective in the afternoon (15:00 to 17:00) when demand of electric power is increased, the power generation cost per hour of the whole power system is high, and since the power plant having high unit power generation cost is stopped in the night when demand of electric power is reduced so that the ratio of the atomic power plants having low unit power generation cost is increased, the power generation cost per hour of the whole power system is low. This means that discharge of electric power in the afternoon (15:00 to 17:00) contributes to reduction of the power generation cost of the whole power plant in operation of the storage battery devices 6. Further, this means that it is better to charge the storage battery devices in the night when the power generation cost is low.

Other new external input is information D4 for incentive cost and charge and discharge efficiency of the storage batteries. The information D4 is inputted from the storage battery devices 6 through the data receiving part 41 and is stored in a storage battery device characteristic data memory part DB5.

FIG. 10 shows an example of characteristic data D4 stored in the characteristic data memory part DB5. As shown in FIG. 10, information such as schedule change incentive cost, additional charge and discharge incentive cost and efficiency in charge and discharge of electric power for each of the storage batteries is stored therein.

Figure 11:
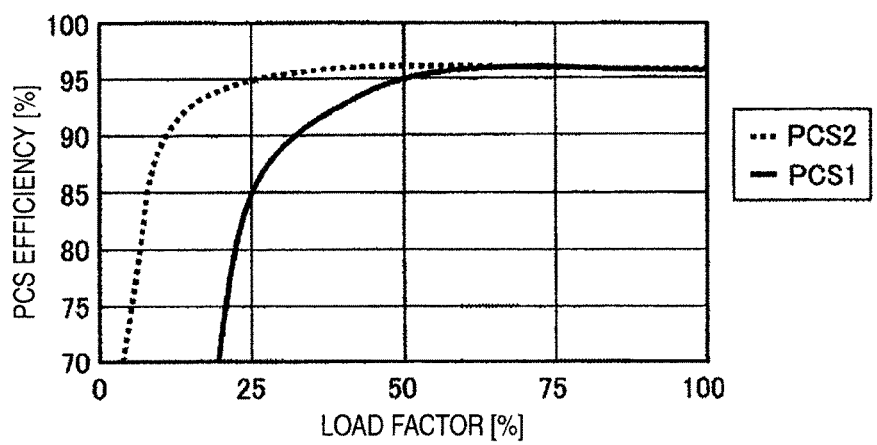
FIG. 11 is a diagram showing the relation between PCS efficiency and load factor.
Figure 12:
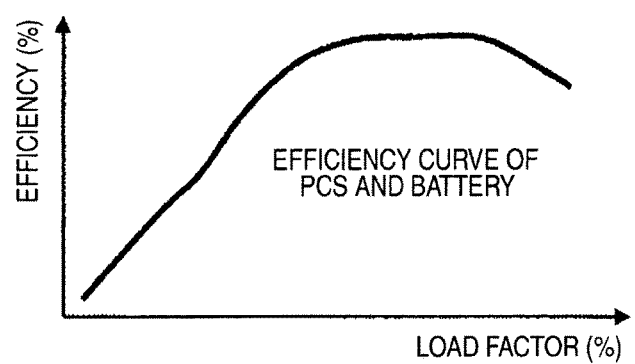
FIG. 12 is a diagram showing the relation between load factor containing PCS and battery and efficiency.

Further, the characteristic information of the storage battery system in the storage battery device characteristic data memory part DB5 may include the relation between PCS (Power Control System) efficiency and load factor as shown in FIG. 11 and the relation between load factor containing PCS and battery and efficiency as shown in FIG. 12. The PCS efficiency of FIG. 11 has a tendency that the higher the load factor is, the higher the efficiency is, although when the PCS is combined with the battery, the battery characteristic that the efficiency is reduced when the load factor is high is dominant and mountain-shaped efficiency is exhibited. Accordingly, in order to make operation in the vicinity of the maximum efficiency, a combination of storage batteries reflecting the characteristics of the storage batteries may be effective.

When the storage battery device schedule calculation part 52 makes a schedule of the surplus power maximum intensive amount calculated by the storage battery device surplus power maximum intensive amount calculation part 45, the storage battery device schedule calculation part 52 decides the storage battery devices operable within the designated time, operation time period, output and the like in consideration of the cost information on the power system side stored in the time-period-classified power generation cost data memory part DB4 and the efficiency information on the storage battery side stored in the storage battery device characteristic data memory part DB5.

The calculation result obtained by the storage battery device schedule calculation part 52 is stored in the storage battery schedule calculation result memory part DB6. This stored data (intensive result of surplus power and further cost at this time) is transmitted to the storage battery group operation instructing device 3 in the central power supply instructing place F through a data transmission part 48 as a response signal R1 of FIG. 1.

The storage battery group operation instructing device 3 is supplied with the above contents and incorporates the contents into the economic load distribution calculation. There is a variety of treatment for the storage batteries in the economic load distribution calculation, although there is consideration that the power amount is distributed to the storage batteries with the highest priority and the remaining power amount is distributed to the thermal, hydraulic and atomic electric generators. Further, since it is easy to cope with instantaneous variation in load, it is also considered that the power amount is supplied concentratedly in the time period that the variation in load is grasped in advance. Anyway, the power amount for the storage batteries is incorporated into the economic load distribution and as a result the final operation instruction C2 is decided.

The operation instruction C2 is sent to the storage battery management device 4 and further sent to the storage battery schedule calculation result memory part DB6 through an instruction receiving part 49. The operation instruction C2 at this time contains information of combination pattern of the storage battery devices 6 and the active use amount. As a result, the storage battery schedule for the storage batteries selected in accordance with the operation instruction C2 from among the operable storage battery devices 6 prepared at the beginning by the storage battery device schedule calculation part 52 is sent to the storage battery devices 6 of the consumer through a data transmission part 54 and is subjected to the predetermined operation in the predetermined time, so that contribution is made to economic load distribution operation as the whole power system.

Here, when the power distribution plan by the storage battery group calculated by the maximum surplus power intensive amount calculation and stored in the storage battery schedule calculation result memory part DB6 is supposed to be an initial schedule, the power distribution plan by the operation instruction C2 effected by investigation result of the economic load distribution is to be named a final schedule. The initial schedule and the final schedule are the same in a case and are also different in a case.

The embodiment of the present invention shown in FIG. 8 is constructed as above and contributes to improvement in operation of the power system by the storage battery devices. Further, some apparatus structures, including the storage battery management device 4 and the storage battery group operation instructing device 3 in the central power supply instructing place F, and some operation methods can be modified by the operator and the functions thereof can be apportioned differently.

For example, the storage battery group operation instructing device 3 first executes the economic load distribution calculation and designates the time period and the power amount decided thereby as the storage battery operation instruction C1 and the storage battery management device 4 can decide a combination of storage battery devices satisfying this requirement. In this case, processing of the response signal R1 and the second operation instruction C2 is not performed.

Alternatively, the storage battery group operation instructing device 3 may designate only the time period as the storage battery operation instruction C1 and the storage battery management device 4 may calculate the storage battery devices operable in this time period and all power amounts, so that the storage battery group operation instructing device 3 or the operator may decide a combination of storage battery devices satisfying the requirement from thereamong.

As described above, some modification structures can be adopted in such apparatus structure or functional apportionment, although the gist of the present invention is to incorporate the storage battery devices into the whole operation of economic load distribution of the power system. When the storage battery devices are incorporated into the economic load distribution, it is needless to say that many variations can be made without departing from the gist of the present invention.

Next, the operation pattern at the time that the initial schedule is corrected and the final schedule is obtained is described in the case where simulation is made using four storage battery devices. Further, the initial schedule is a storage battery plan obtained by calculating the maximum output at the time that an empty capacity of the storage battery devices 6 of the consumer is utilized to the maximum. The restriction conditions such as output, capacity and SOC of the storage batteries of FIG. 4, the incentive cost information of FIG. 10 and the power generation cost per hour of FIG. 9 are reflected to the calculation of the initial schedule and maximization of discharge output of the storage batteries and minimization of cost are attained.

Here, there is described that when the initially calculated plan is changed, re-calculation can be re-tried to calculate the optimum solution which satisfies the restriction conditions. Further, the re-calculation can be made by any of the storage battery group operation instructing device 3 and the storage battery management device 4. Information necessary for calculation in that case is accommodated properly.

FIGS. 13 to 16 are graphs for the storage batteries 6a, 6b, 6c and 6d, respectively. In these graphs, the horizontal axis represents time in a day and the vertical axis represents charge and discharge power (kW) and SOC (kWh). The initial schedule of charge and discharge power is indicated by white column graph and the final schedule is indicated by black column graph. Further, the initial schedule of SOC is indicated by line graph of white circle and the final schedule is indicated by line graph of black square. The part where white and black column graphs are indicated alternately means that the initial and final schedules are the same (not changed). The part where only black circle is indicated and white circle is not indicated means that the initial and final schedules are the same (not changed).

The four storage battery devices of FIGS. 13 to 16 are charged in the time period in the early morning and are discharged from the daytime to the evening. In the initial schedule indicated in white, a desired pattern discharge amount is secured in total of the four storage battery devices of FIGS. 13 to 16.

In the final schedule, it is supposed that the storage battery operation instruction C2 from the central power supply instructing place F is changed so as to be output of 40 kW at 15:00. In this case, the objective function is re-calculated while minimizing cost. Finally, it is understood that discharge patterns of the storage batteries 6b and 6d are greatly changed and concentrated at maximum designation time from 13:00 to 15:00 and is shifted from the initial schedule. As described above, it is understood that even if the discharge pattern is changed from the initial schedule, the discharge pattern can be changed as the restriction condition of minimum cost is satisfied.

Figure 13:
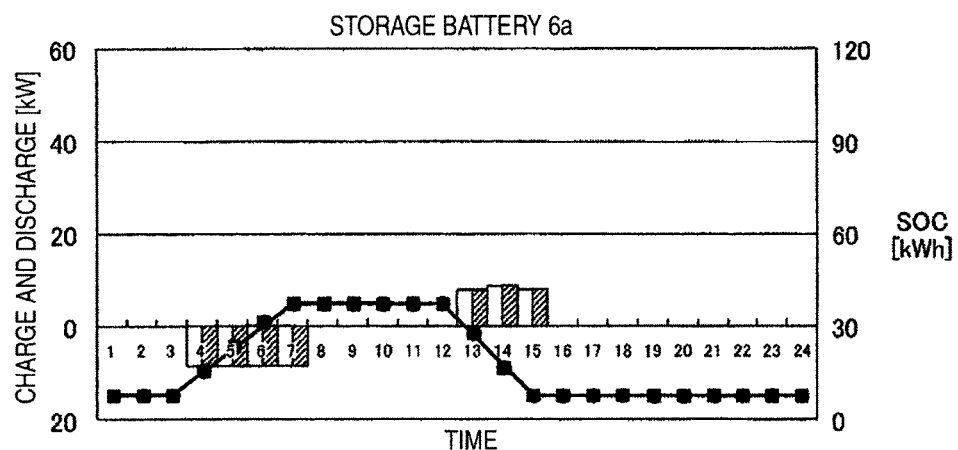
FIG. 13 is a diagram showing change in charge and discharge power and SOC of a storage battery 1 at the time that a plan is changed.
Figure 14:
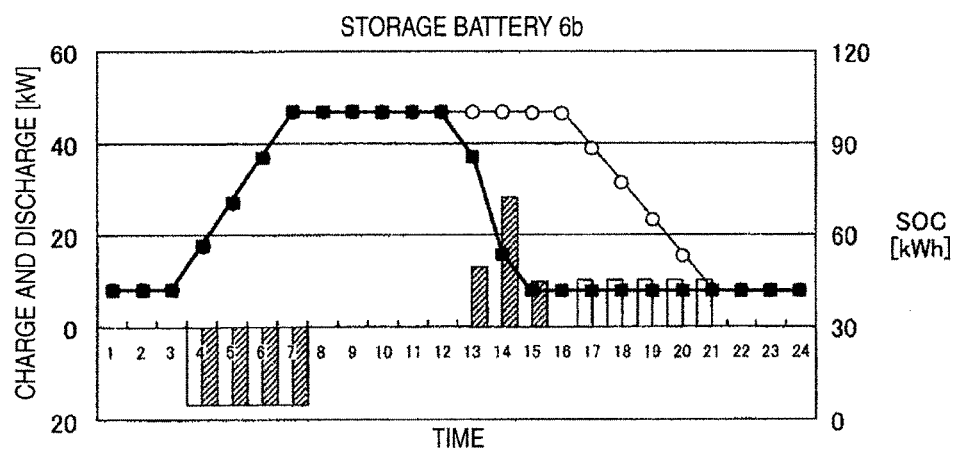
FIG. 14 is a diagram showing change in charge and discharge power and SOC of a storage battery 2 at the time that a plan is changed.
Figure 15:
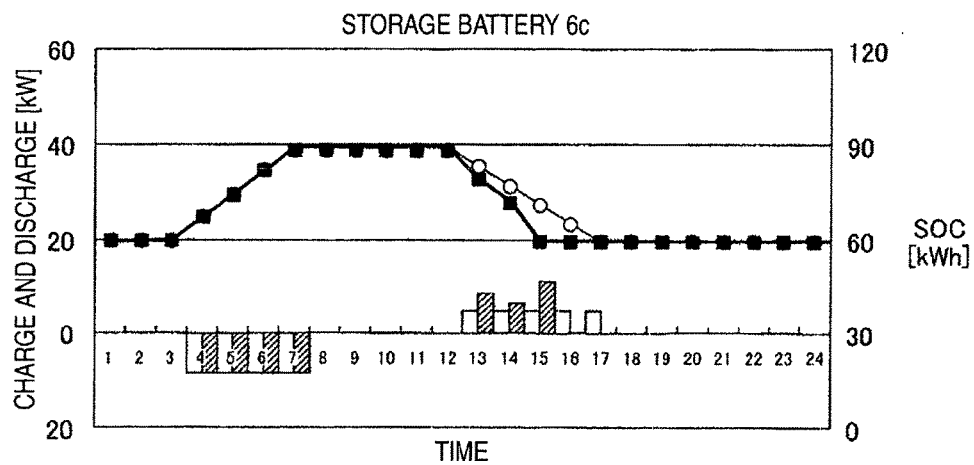
FIG. 15 is a diagram showing change in charge and discharge power and SOC of a storage battery 3 at the time that a plan is changed.
Figure 16:
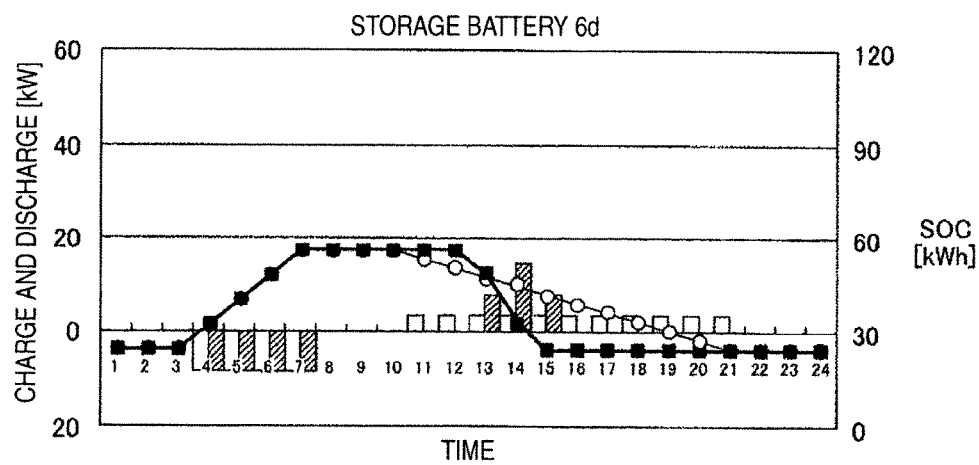
FIG. 16 is a diagram showing change in charge and discharge power and SOC of a storage battery 4 at the time that a plan is changed.
Figure 17:
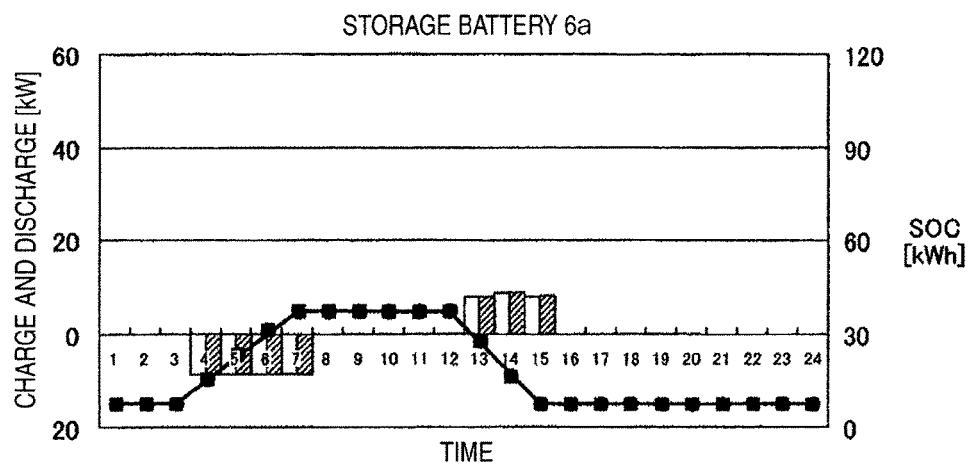
FIG. 17 is a diagram showing change in charge and discharge power and SOC of the storage battery 1 in case where capacity is utilized to the maximum.
Figure 18:
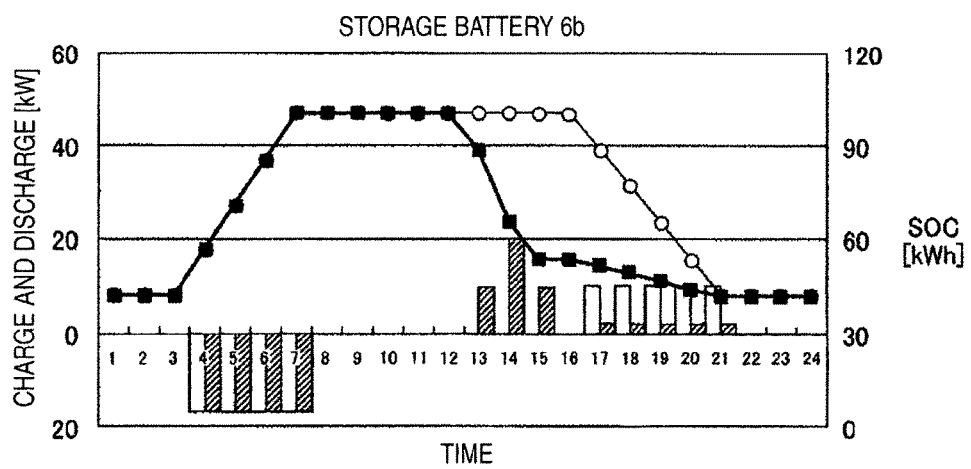
FIG. 18 is a diagram showing change in charge and discharge power and SOC of the storage battery 2 in case where capacity is utilized to the maximum.
Figure 19:
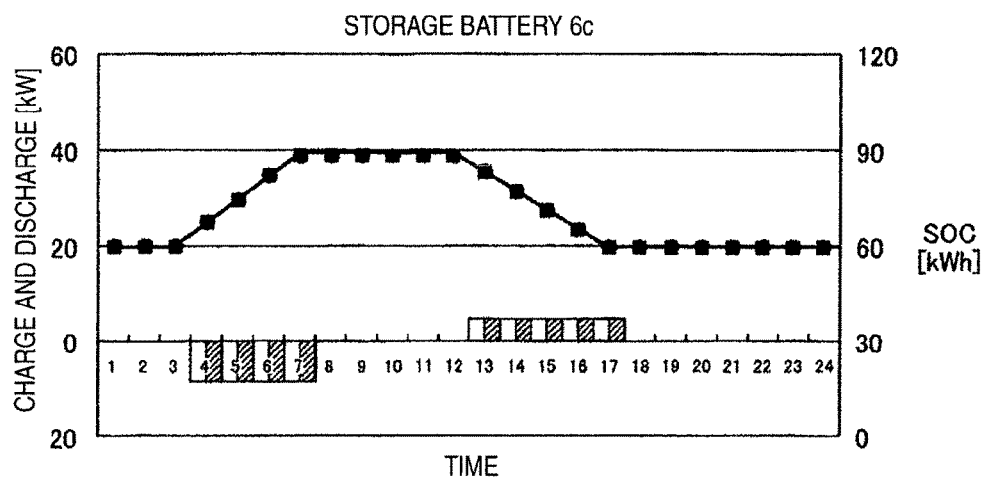
FIG. 19 is a diagram showing change in charge and discharge power and SOC of the storage battery 3 in case where capacity is utilized to the maximum.
Figure 20:
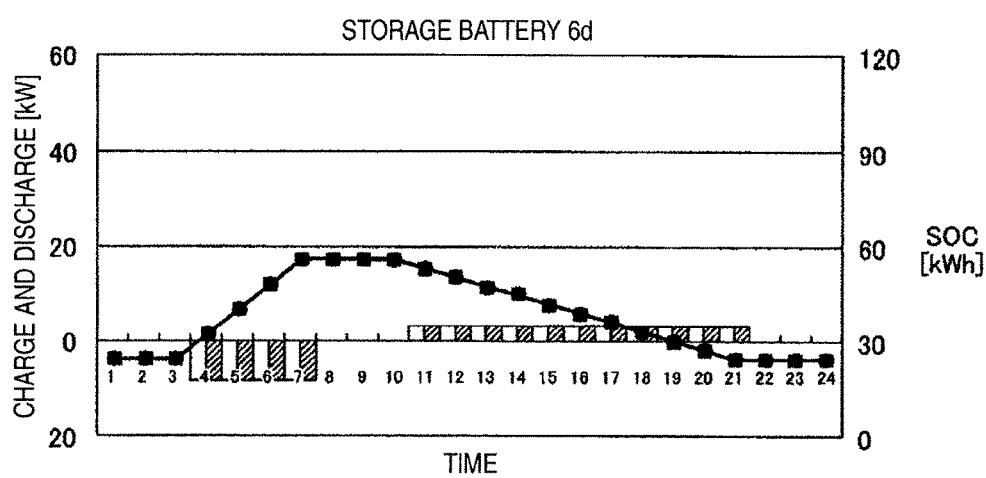
FIG. 20 is a diagram showing change in charge and discharge power and SOC of the storage battery 4 in case where capacity is utilized to the maximum.

Further, after the output maximum value is calculated under conditions of FIGS. 13 to 15, the output is set and the case where the output is maximum is considered in the plan of the storage batteries that the cost is minimized. FIGS. 17 to 20 show the charge and discharge patterns of the storage batteries 6a to 6d for the initial schedule and the final schedule. It is understood that the schedule for the storage batteries 6a and 6b is greatly changed since the incentive cost of the storage batteries 6a and 6b is inexpensive and the discharge amount except the pattern designation time is reduced. It is understood that the schedule for the storage batteries 6c and 6d is not changed since the incentive cost of the storage batteries 6c and 6d is expensive. As described above, it is understood that even if the charge and discharge pattern is changed from the initial schedule, the charge and discharge pattern can be changed easily as the restriction conditions are satisfied.

Figure 21:
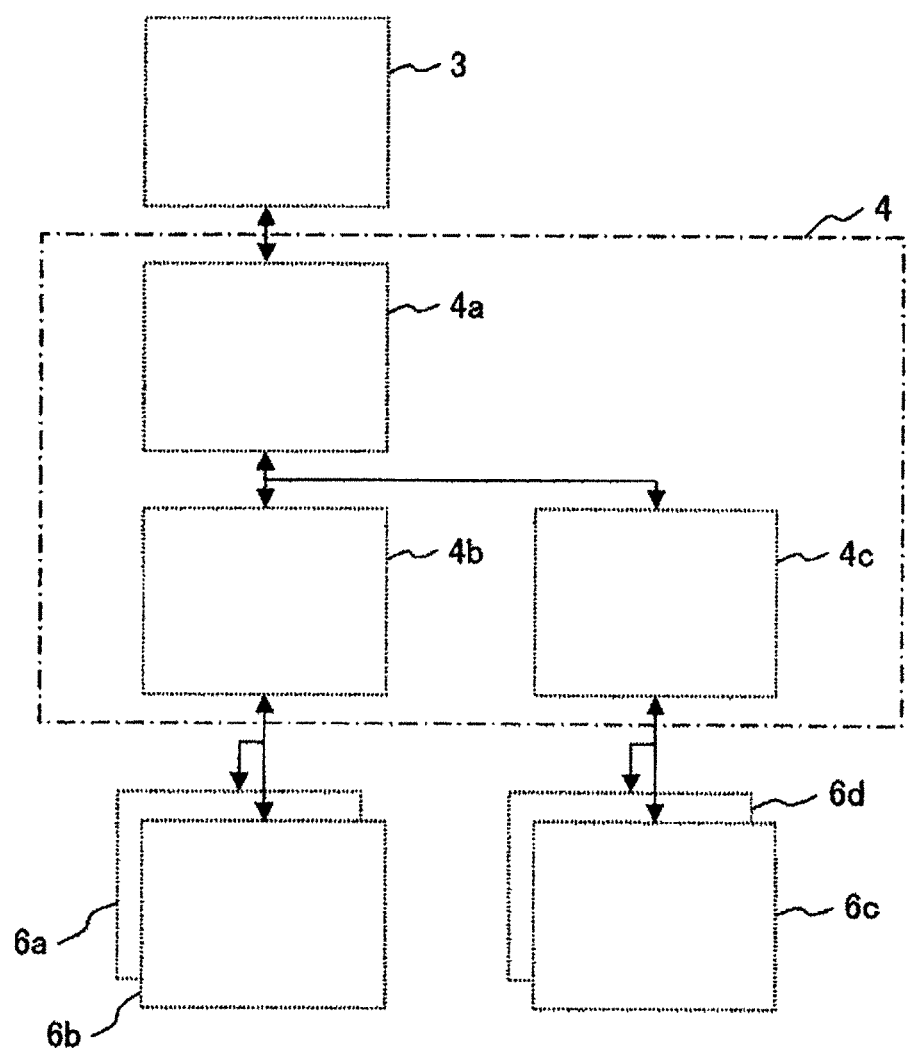
FIG. 21 is a diagram showing an example in which the storage battery management device 4 is stratified.

Further, in construction of the storage battery management device 4 of FIG. 1, when the number of the storage battery devices of the power system is large or when the storage battery devices are easy to be managed by dividing the storage battery devices for dispersion of loads, the storage battery management device 4 may be stratified as shown in FIG. 21. For example, a calculation part and a memory part are disposed in part of 4a, and 4b and 4c are dispersed locally. Further, a data receiving part and a data transmission part are disposed in the center. Alternatively, plural devices 4b and 4c of FIG. 8 may be dispersedly disposed locally without providing 4a. The above description has been made to the embodiments, although it will be apparent to those skilled in the art that the present invention is not limited thereto and various changes and modifications can be made without departing from the spirit and the scope of the appended claims of the present invention.

REFERENCE SINGS LIST

B . . . bus line
C . . . storage battery operation instruction
DB1 . . . restriction data memory part
DB2 . . . storage battery pattern setting memory part
DB3 . . . request pattern data memory part
DB4 . . . time-period-classified power generation cost data memory part
DB5 . . . characteristic data memory part
DB6 . . . storage battery schedule calculation result memory part
E . . . economic load distribution control device
F . . . central power supply instructing place
G1 . . . thermal electric generator
G2 . . . hydraulic electric generator
G3 . . . atomic electric generator
Pd . . . power demand instruction
T . . . transformer
Li . . . transmission line
Ld . . . load
3 . . . storage battery group operation instructing device
4 . . . storage battery management device
6 . . . storage battery device
42 . . . storage battery pattern setting part
4 . . . data receiving part
45 . . . storage battery device surplus power maximum intensive amount calculation part
52 . . . storage battery device schedule calculation part

The invention claimed is:

1. A method of operating a power system including plural storage battery devices and plural electric generators, comprising:

determining which of the storage battery devices are available to supply power in a prearranged time period on a prearranged date, wherein storage battery devices that are scheduled to be stopped during the prearranged time period are excluded from the available storage battery devices;

calculating power amounts by the available storage battery devices capable of supplying electric power in the prearranged time period on the prearranged date;

executing calculation of economic load distribution of the power system for controlling a supply of power with said available battery storage devices to maintain the power demand supply balance in view of power fluctuation components in a predetermined period and allocate the power;

determining whether a change in the economic load distribution of the power system occurs and, when a determination is made that the change occurs, recalculating the economic load distribution of the power system; and executing supplying of electric power by the available storage battery devices capable of supplying electric power in the prearranged time period on the prearranged date, such that the available storage battery devices are utilized evenly considering operation plans and cost of the available storage battery devices.

2. The method of operating a power system according to claim 1, wherein
when the power amounts by the storage battery devices capable of supplying electric power in the prearranged time period on the prearranged date are calculated, operation plans in individual storage battery devices of consumers are considered.

3. The method of operating a power system according to claim 1, wherein
when the power amounts by the storage battery devices capable of supplying electric power in the prearranged time period on the prearranged date are calculated, restriction conditions are considered from output (kW) and capacity (kWh) of the individual storage battery devices.

4. The method of operating a power system according to claim 1, wherein
when the power amounts by the storage battery devices capable of supplying electric power in the prearranged time period on the prearranged date are calculated, efficiency of the individual storage battery devices is considered.

5. The method of operating a power system according to claim 1, wherein
when the power amounts by the storage battery devices capable of supplying electric power in the prearranged time period on the prearranged date are calculated, power generation cost for each of different time periods in the power system is considered.

6. The method of operating a power system according to claim 1, wherein
when the power amounts by the storage battery devices capable of supplying electric power in the prearranged time period on the prearranged date are calculated, operation circumstances of the storage battery devices are changed in advance so that the storage battery devices can be used in the prearranged time period.

7. A method of operating a power system including plural storage battery devices and plural electric generators, comprising:
designating a prearranged time period on a prearranged date;
determining which of the storage battery devices are available to supply power in the prearranged time period on the prearranged date, wherein storage battery devices that are scheduled to be stopped during the prearranged time period are excluded from the available storage battery devices;
calculating maximum power amounts by the available storage battery devices capable of supplying electric power in the prearranged time period;
executing calculation of economic load distribution of the power system for controlling a supply of power with said available battery storage devices to maintain power demand supply balance in view of power fluctuation components in a predetermined period and allocate the power;
determining power amounts capable of being supplied by the available storage battery devices under conditions based on the economic load distribution calculation;
determining whether a change in the economic load distribution of the power system occurs and, when a determination is made that the change occurs, recalculating the economic load distribution of the power system; and
executing supplying of electric power by the available storage battery devices having the determined power amounts in the prearranged time period, such that the available storage battery devices are utilized evenly considering operation plans and cost of the available storage battery devices.

8. A method of operating a power system including plural storage battery devices and plural electric generators, comprising:
determining which of the storage battery devices are available to supply power in a prearranged time period on a prearranged date, wherein storage battery devices that are scheduled to be stopped during the prearranged time period are excluded from the available storage battery devices;
executing calculation of economic load distribution of the power system for controlling a supply of power with said available battery storage devices to maintain the power demand supply balance in view of power fluctuation components in a predetermined period and allocate the power in the prearranged time period on the prearranged date, determining whether a change in the economic load distribution of the power system occurs and, when a determination is made that the change occurs, recalculating the economic load distribution of the power system, and executing supplying of electric power by the available storage battery devices in the prearranged time period on the prearranged date, such that the available storage battery devices are utilized evenly considering operation plans and cost of the available storage battery devices.

9. A device for operating a power system including plural storage battery devices and plural electric generators, comprising:
means for designating a prearranged time period on a prearranged date;
means for determining which of the storage battery devices are available to supply power in the prearranged time period on the prearranged date, wherein storage battery devices that are scheduled to be stopped during the prearranged time period are excluded from the available storage battery devices;
power amount calculation means for calculating maximum power amounts by the available storage battery devices capable of supplying electric power in the prearranged time period;
economic load distribution calculation means for calculating economic load distribution of the power system for controlling a supply of power with said available battery storage devices to maintain the power demand supply balance in view of power fluctuation components in a predetermined period and allocate the power;
power amount decision means for determining power amounts capable of being supplied by the available storage battery devices under conditions based on the economic load distribution calculation; and
storage battery control means for supplying electric power by the available storage battery devices having the determined power amounts in the prearranged time period, such that the available storage battery devices are utilized evenly considering operation plans and cost of the available storage battery devices;
wherein, when a determination is made that a change in the economic load distribution of the power system occurs, the economic load distribution calculation means recalculates the economic load distribution of the power system, and the storage battery control means supplies the electric power based on a recalculated economic load distribution.

10. The device of operating a power system according to claim 9, wherein
the power amount calculation means includes means for inputting operation plans of individual storage battery devices of consumers and when the power amounts by the storage battery devices capable of supplying electric power in the prearranged time period on the prearranged date are calculated, the operation plans are considered.

11. The device for operating a power system according to claim 9, wherein
the power amount calculation means includes means for inputting restriction data for output (kW) and capacity (kWh) of the individual storage battery devices and when the power amounts by the storage battery devices capable of supplying electric power in the prearranged time period on the prearranged date are calculated, the restriction conditions are considered from the output (kW) and capacity (kWh).

12. The device for operating a power system according to claim 9, wherein
the power amount calculation means includes means for inputting efficiency of the individual storage battery devices and when the power amounts by the storage battery devices capable of supplying electric power in the prearranged time period on the prearranged date are calculated, the efficiency of the individual storage battery devices is considered.

13. The device for operating a power system according to claim 9, wherein
the power amount calculation means includes means for inputting power generation cost for each time period in the power system and when the power amounts by the storage battery devices capable of supplying electric power in the prearranged time period on the prearranged date are calculated, the power generation cost for each of different time periods in the power system is considered.

14. The device for operating a power system according to claim 9, wherein
the power amount calculation means includes control means for issuing control instructions for changing operation circumstances of the storage battery devices in advance so that the storage battery devices can be used in the prearranged time period when the power amounts by the storage battery devices capable of supplying electric power in the prearranged time period on the prearranged date are calculated.

15. A power system operating device which operates a power system including plural storage battery devices and plural electric generators in accordance with instructions from a central power supply instructing apparatus, comprising:
means, disposed in the central power supply instructing apparatus, for designating a prearranged time period on a prearranged date;
means, disposed in a storage battery management device, for determining which of the storage battery devices are available to supply power in the prearranged time period on the prearranged date, wherein storage battery devices that are scheduled to be stopped during the prearranged time period are excluded from the available storage battery devices;
power amount calculation means, disposed in the storage battery management device, for calculating maximum power amounts by the available storage battery devices capable of supplying electric power in the prearranged time period;
economic load distribution calculation means, disposed in the central power supply instructing apparatus, for calculating economic load distribution of the power system for controlling a supply of power with the available storage battery devices to maintain the power demand supply balance in view of power fluctuation components in a predetermined period and allocate the power;
power amount decision means to determine the power amounts capable of being supplied by the available storage battery devices under conditions based on the economic load distribution calculation; and
instruction means, disposed in the storage battery management device, for instructing supply of electric power by the available storage battery devices of the determined power amounts in the prearranged time zone, such that the available storage battery devices are utilized evenly considering operation plans and cost of the available storage battery devices,
wherein the storage battery devices are installed in various places of the power system and have charge and discharge control function and communication function to transmit storage battery information to the storage battery management device and perform charge and discharge control in accordance with power supply instructions from the storage battery management device; and
wherein, when a determination is made that a change in the economic load distribution of the power system occurs, the economic load distribution calculation means recalculates the economic load distribution of the power system, and the instruction means instructs the supply of the electric power based on a recalculated economic load distribution.

16. The power system operating device according to claim 15, wherein
the storage battery information to be transmitted to the storage battery management device includes operation plans, restriction data and charging and discharging efficiency of the storage battery devices.

17. The power system operating device according to claim 15, wherein
the storage battery management device obtains power generation cost for each of different time periods in the power system from the central power supply instructing apparatus.

18. A storage battery management device connected to storage battery devices installed in various places of a power system and having charge and discharge control function and communication function and a central power supply instructing apparatus to calculate economic load distribution for controlling a supply of power with said battery storage devices to maintain the power demand supply balance in view of power fluctuation components in a predetermined period and allocate the power and supply output instructions to plural electric generators of the power system, said storage battery management device comprising:
means for determining which of the storage battery devices are available to supply power in a prearranged time period on a prearranged date, wherein storage battery devices that are scheduled to be stopped during the prearranged time period are excluded from the available storage battery devices;

power amount calculation means for calculating maximum power amounts by the available storage battery devices capable of supplying electric power in the prearranged time period on the prearranged date designated by the central power supply instructing apparatus; and transmission means for transmitting power amounts capable of being supplied by the available storage battery devices based on the economic load distribution calculation in the central power supply instructing apparatus to the storage battery devices, such that the available storage battery devices are utilized evenly considering operation plans and cost of the available storage battery devices;

wherein, when a determination is made that a change in the economic load distribution occurs, the central power supply instructing apparatus recalculates the economic load distribution and supplies the electric power based on a recalculated economic load distribution.

\* \* \* \* \*